(12) United States Patent
Blanchard et al.

(10) Patent No.: US 9,186,865 B2
(45) Date of Patent: Nov. 17, 2015

(54) ACOUSTIC ABSORBENT WALL COATING

(75) Inventors: Benjamin Blanchard, Taverny (FR); Erisela Nikaj, Paris (FR); Katarzyna Chuda, Villejuif (FR); Sylvain Berger, Paris (FR)

(73) Assignee: SAINT-GOBAIN ADFORS, Chambery (FR)

( * ) Notice: Subject to any disclaimer, the term of this patent is extended or adjusted under 35 U.S.C. 154(b) by 132 days.

(21) Appl. No.: 14/235,373

(22) PCT Filed: Jul. 16, 2012

(86) PCT No.: PCT/FR2012/051686
§ 371 (c)(1),
(2), (4) Date: Mar. 14, 2014

(87) PCT Pub. No.: WO2013/014364
PCT Pub. Date: Jan. 31, 2013

(65) Prior Publication Data
US 2015/0122399 A1 May 7, 2015

(30) Foreign Application Priority Data

Jul. 28, 2011 (FR) ...................................... 11 56904

(51) Int. Cl.
| | | |
|---|---|---|
| *E04F 13/072* | (2006.01) | |
| *E04F 13/075* | (2006.01) | |
| *B32B 37/12* | (2006.01) | |
| *B32B 37/14* | (2006.01) | |
| *B29C 65/48* | (2006.01) | |
| *C09J 5/00* | (2006.01) | |
| *B32B 5/26* | (2006.01) | |
| *B32B 5/02* | (2006.01) | |
| *B32B 5/18* | (2006.01) | |
| *B32B 5/24* | (2006.01) | |
| *B32B 7/14* | (2006.01) | |
| *B32B 17/02* | (2006.01) | |
| *G10K 11/168* | (2006.01) | |
| *E04B 1/84* | (2006.01) | |
| *E04F 13/00* | (2006.01) | |
| *E04F 13/08* | (2006.01) | |
| *G10K 11/162* | (2006.01) | |
| *E04B 1/86* | (2006.01) | |

(Continued)

(52) U.S. Cl.
CPC . *B32B 5/26* (2013.01); *B32B 5/022* (2013.01); *B32B 5/18* (2013.01); *B32B 5/24* (2013.01); *B32B 7/14* (2013.01); *B32B 17/02* (2013.01); *B32B 37/04* (2013.01); *B32B 37/18* (2013.01); *E04B 1/8409* (2013.01); *E04B 1/86* (2013.01); *E04F 13/002* (2013.01); *E04F 13/0867* (2013.01); *G10K 11/162* (2013.01); *G10K 11/168* (2013.01); *B32B 2262/02* (2013.01); *B32B 2262/0284* (2013.01); *B32B 2262/101* (2013.01); *B32B 2262/12* (2013.01); *B32B 2305/022* (2013.01); *B32B 2307/102* (2013.01); *B32B 2419/00* (2013.01); *B32B 2607/00* (2013.01); *B32B 2607/02* (2013.01); *E04B 2001/8466* (2013.01)

(58) Field of Classification Search
CPC ............ B32B 5/022; B32B 5/18; B32B 5/24; B32B 5/26; B32B 7/14; B32B 17/02; B32B 17/10; B32B 37/04; B32B 37/18; B32B 38/0036; B32B 2262/02; B32B 2262/0284; B32B 2262/101; B32B 2262/12; B32B 2305/022; B32B 2307/102; B32B 2419/00; B32B 2607/00; B32B 2607/002; E04B 1/84; E04B 1/8409; E04B 1/86; E04B 2001/8666; G10K 11/162; G10K 11/168; E04F 13/002; E04F 13/0867; D04H 1/42; D06N 3/0045; B29C 65/18; B29C 66/43
USPC .............. 156/71, 308.2, 309.6; 428/174, 175, 428/212, 220, 304.4, 332, 340
See application file for complete search history.

(56) References Cited

U.S. PATENT DOCUMENTS

| | | | |
|---|---|---|---|
| 4,283,457 A | | 8/1981 | Kolsky et al. |
| 5,681,408 A | * | 10/1997 | Pate et al. ........................ 156/71 |
| 6,220,388 B1 | * | 4/2001 | Sanborn ........................ 181/290 |

(Continued)

FOREIGN PATENT DOCUMENTS

| | | |
|---|---|---|
| CH | 650 196 | 7/1985 |
| DE | 102010050336 | 5/2011 |

(Continued)

OTHER PUBLICATIONS

International Search Report as issued for International Application No. PCT/FR2012/051686, dated Oct. 29, 2012.

(Continued)

*Primary Examiner* — Sing P Chan
(74) *Attorney, Agent, or Firm* — Pillsbury Winthrop Shaw Pittman LLP

(57) ABSTRACT

A multilayer sound-absorbing covering includes (a) a support layer made of a nonwoven based on organic fibers having a tranverse multilobal cross section, (b) a surface layer formed by a glass textile, having a static air flow resistance, measured according to the standard ISO 9053, between $10^5$ N·s·m$^{-4}$ and $10^6$ N·s·m$^{-4}$, (c) at the interface between the support layer (a) and the surface layer (b), a discontinuous adhesive layer having a surface density between 17 and 60 g/m$^2$. There is also provided a process for manufacturing such a covering and to the use of such a covering for improving the acoustic comfort of a room or of a building.

24 Claims, No Drawings

(51) Int. Cl.
    *B32B 37/04*     (2006.01)
    *B32B 37/18*     (2006.01)

(56)     References Cited

U.S. PATENT DOCUMENTS

| | | | |
|---|---|---|---|
| 6,256,600 B1* | 7/2001 | Bolton et al. | 703/6 |
| 6,345,688 B1* | 2/2002 | Veen et al. | 181/290 |
| 6,443,257 B1* | 9/2002 | Wiker et al. | 181/290 |
| 6,815,383 B1 | 11/2004 | Arnold | |
| 9,044,700 B2* | 6/2015 | Gruenbacher et al. | 1/1 |
| 2002/0117352 A1* | 8/2002 | Veen et al. | 181/292 |
| 2006/0012072 A1 | 1/2006 | Hagewood et al. | |
| 2009/0173569 A1* | 7/2009 | Levit et al. | 181/286 |
| 2009/0173570 A1* | 7/2009 | Levit et al. | 181/286 |
| 2010/0006372 A1* | 1/2010 | Bischoff et al. | 181/290 |
| 2010/0272983 A1* | 10/2010 | Thouilleux et al. | 428/318.4 |
| 2014/0331622 A1* | 11/2014 | Gruenbacher et al. | 55/361 |
| 2014/0331623 A1* | 11/2014 | Gruenbacher et al. | 55/364 |
| 2014/0331625 A1* | 11/2014 | Gruenbacher et al. | 55/467 |
| 2014/0331859 A1* | 11/2014 | Gruenbacher et al. | 95/26 |

FOREIGN PATENT DOCUMENTS

| | | | | |
|---|---|---|---|---|
| EP | 0 201 812 | | 11/1986 | |
| EP | 0 271 681 | | 6/1988 | |
| EP | 0 595 157 | | 5/1994 | |
| EP | 0 860 521 | | 8/1998 | |
| EP | 2 272 999 | | 1/2011 | |
| FR | 0 061 369 | | 9/1982 | |
| FR | 2 672 908 | | 8/1992 | |
| GB | 00811631 A | * | 4/1959 | D06N 7/00 |
| WO | WO 03/105982 | | 12/2003 | |
| WO | WO 2006/066601 | | 6/2006 | |

OTHER PUBLICATIONS

International Preliminary Report on Patentability and the Written Opinion of the International Searching Authority as issued for International Application No. PCT/FR2012/051686, dated Jan. 28, 2014.

* cited by examiner

ACOUSTIC ABSORBENT WALL COATING

CROSS-REFERENCE TO RELATED APPLICATIONS

This application is the U.S. National Stage of PCT/FR2012/051686, filed Jul. 16, 2012, which in turn claims priority to French Application No. 1156904, filed Jul. 28, 2011. The content of both applications are incorporated herein by reference in their entirety.

The present invention relates to a paintable multilayer wall covering comprising a glass textile adhesively bonded to a nonwoven based on fibers having a miltilobal cross section and which, even in the painted state, has a high sound absorption capacity. It also relates to a process for manufacturing such a covering and the use thereof for improving the acoustic comfort of a room or of a building.

The concept of "acoustic comfort", like the idea of comfort in general, is a relatively subjective concept. However, it is generally agreed to define good acoustic comfort by a good intelligibility of sounds such as human voices or music, a reverberation time that is neither too short to avoid the impression of muffled sounds, nor too long to avoid a residual echo that is too pronounced, and the absence of sound having an excessive sound power. The quality of the acoustic comfort is mainly governed by the attenuation of sounds using sound-absorbing materials, fixed for example to the walls and/or to the floor.

It is important to distinguish acoustic comfort from acoustic insulation. When sound encounters an obstacle, such as a wall of a building, one portion of the incident sound energy is reflected, another is absorbed and a third is transmitted by the obstacle. The purpose of acoustic insulation is to reduce the transmission of sound, whereas the objective of improving acoustic comfort is the reduction and optimization of the reflected component of the sound.

The two most used parameters for evaluating the quality of acoustic comfort are the reverberation time and the sound absorption coefficient, also referred to as the Alpha Sabine index ($\alpha_w$). The latter is defined as the ratio of the sound energy absorbed by a given material to the incident sound energy ($E_a/E_i$). The Alpha Sabine index is determined by diffuse field measurements carried out according to the standard NF EN ISO 354 (measurement of sound absorption in a reverberation room) and is calculated in accordance with the standard NF EN ISO 11654 (Absorbers for use in buildings—Evaluation of the sound absorption).

From the sound absorption coefficient obtained in a diffuse field, various classes of performance are defined, described in the standard NF EN ISO 11654.

Generally, a sound-absorbing material or covering having a given porous or fibrous structure and chemical nature absorbs sound much more effectively when it is thick, in other words its $\alpha_w$ index increases with the thickness. For reasons that are easy to understand, it is not however desirable to market wall coverings having an excessive thickness. They would require large storage and transport capacities and their installation by private individuals would be difficult. An excessive thickness, for example beyond around 1 cm, would also pose esthetic problems, in particular in the field of housing for private individuals.

Another problem of sound-absorbing wall coverings is their surface appearance. The best sound absorption properties are generally obtained with coatings that have a porous surface layer, highly permeable to air and therefore to sound. Such porous surface layers are not however always satisfactory from an esthetic viewpoint, in particular they are not generally intended to be painted, and when they may be covered with a layer of paint, their sound absorption capacity decreases drastically.

The objective of the present invention is to propose a paintable wall covering having, even in the painted state, a sound absorption coefficient that enables it to be classified, as a sound-absorbing covering according to the standard NF EN ISO 11654, at least in class E ($\alpha_w$=0.15 to 0.25), or even in class D ($\alpha_w$=0.30 to 0.55), and of which the thickness, before painting, does not exceed 6 mm. The wall covering of the present invention must thus combine good sound absorption properties and a satisfactory esthetic appearance, as close as possible to commercial paintable wall coverings, such as the coverings based on glass fiber cloth.

A certain number of documents describe sound-insulating multilayer wall coverings.

Thus, application CH 650 196 describes a multilayer wall covering comprising an open-porosity foam support containing fillers and fire-retardant components, and a textile surface layer, for example made of polyester. Inserted between the two layers is a perforated aluminum foil, intended to improve the fire resistance of the covering.

Application FR 2 672 908 describes a multilayer wall covering in which a layer of fabric is adhesively bonded by means of a heat-sealing continuous film to a foam support, which foam support is in turn adhesively bonded by means of a second heat-sealing continuous film to an underlayer.

Similarly, FR 0 061 369 discloses a wall covering in which a synthetic polymer textile is adhesively bonded by means of a heat-sealing continuous film made of polyethylene to a sheet of open-porosity foam.

EP 0 271 681 discloses a sound-absorbing wall covering in which an air-permeable paper or fabric layer is adhesively bonded to a spacer structure, for example a textile, perforated board or a plastic grid. The fabric-covered spacer structure is in turn adhesively bonded to a sound-absorbing porous structure.

U.S. Pat. No. 5,681,408 describes a sound-absorbing multilayer wall covering where two relatively loose textiles are adhesively bonded to one another by means of a polyethylene film.

U.S. Pat. No. 4,283,457 describes a sound-absorbing wall covering in which a needle-punched felt made of glass fibers is adhesively bonded by means of a reactive adhesive to an open-porosity polyurethane foam. The material is described as having good sound absorption properties, but these properties are obtained on a very thick covering, having a thickness between 1 and 2 cm, and in the unpainted state. The needle-punched felt made of glass fibers that forms the surface layer of this covering does not lend itself or does not lend itself very well to the application of an acrylic or glyptal paint.

None of these documents discloses a covering based on glass textile having, even at low thickness and in the painted state, a sound absorption coefficient ($\alpha_w$) greater than or equal to 0.2 allowing a classification as a sound absorber according to the standard NF EN ISO 11654.

The applicant, after many diffuse-field sound absorption tests on painted or unpainted wall coverings, based on a glass textile adhesively bonded to a nonwoven support, has succeeded in highlighting the following three trends:

The glass textile which will be in contact with the paint or with the atmosphere of the room must have an air permeability within a certain range. The air permeability must be sufficient so that sound can penetrate into the underlying foam layer, but should not exceed a value beyond which the material would have an unsatisfactory appearance in the painted state.

The nonwoven support must predominantly consist of fibers having a multilobal cross section. The multilobal cross section of the fibers in effect increases, at identical density, the area of the interface between the walls of the fibers and the air and it is at the level of this interface that sound which has passed through the glass textile is absorbed. The larger the size of this sound-accessible interface, the better the sound absorption coefficient of the final multilayer product will be.

The adhesive layer attaching the glass textile to the nonwoven support must not block all the surface pores of the support, in other words it must leave microscopic zones free where the sound that has passed through the surface layer can penetrate into the nonwoven in order to be absorbed therein. The amount of adhesive must however be sufficient to enable good attachment of the glass textile to the nonwoven support, failing which the sound absorption coefficient decreases undesirably.

The applicant thus observed that by optimizing the above three parameters (air permeability of the glass textile at the surface, structure of the adhesive layer and multilobal structure of the fibers of the nonwoven support) it was possible to obtain thin wall coverings having, in the painted state, an $\alpha_w$ index, determined according to NF EN ISO 354 and NF EN ISO 11654, greater than or equal to 0.25.

Therefore, one subject of the present invention is a multilayer structure, having an overall thickness between 3.5 and 6 mm, comprising:

(a) a support layer made of a nonwoven based on organic fibers having a multilobal transverse cross section, (b) a surface layer formed by a glass textile, having a static air flow resistance, measured according to the standard ISO 9053, between $10^5$ N·s·m$^{-4}$ and $10^6$ N·s·m$^{-4}$, preferably between $5 \times 10^5$ N·s·m$^{-4}$ and $8.5 \times 10^5$ N·s·m$^{-4}$, in particular between $7 \times 10^5$ N·s·m$^{-4}$ and $8 \times 10^5$ N·s·m$^{-4}$, (c) at the interface between the support layer (a) and the surface layer (b), a discontinuous adhesive layer having a surface density between 17 and 60 g/m$^2$, preferably between 20 and 40 g/m$^2$, and ideally between 22 and 27 g/m$^2$.

In the present invention, the three layers (a), (b) and (c) are contiguous with one another, in other words the adhesive layer (c) attaches the surface layer (b) directly to the nonwoven support layer (a), without any other layer (for example aluminum foil, reinforcing layer or spacer layer) being present between layer (a) and (b).

The static air flow resistance values above are those measured for the glass textile in the unpainted state and, of course, before adhesively bonding to the nonwoven support layer.

The nonwoven support forming layer (a) has the distinctive feature of being, at least predominantly, preferably at least 80% by weight, constituted of fibers having a multilobal transverse cross section, also referred to hereinbelow as multilobal fibers. These fibers are organic fibers at least partly consisting of one or more thermoplastic, generally synthetic, polymers.

As examples of synthetic polymers that form the multilobal fibers of layer (a), mention may be made of polyolefins such as polypropylene and polyethylene, polyamide homopolymers or copolymers such as nylons 6/6, 6/9, 6/10, 6/12, 10, 11 and 12, polyimides, polyesters such as poly(alkylene terephthalate)s and poly(alkylene naphthalate)s, polylactic acids, polyhydroxyalkanoates, polyvinyl alcohol, ethylene/vinyl alcohol (EVA) copolymers, polyacrylates, polycaprolactones, ethylene/acrylic acid copolymers, polyacrylic acid, polystyrene, poly(tetrafluoroethylene), polyurethanes, or combinations thereof.

The multilobal fibers used in the present invention may also contain a certain fraction, preferably less than 30%, of non-thermoplastic materials, such as for example viscose, rayon, lyocell, cotton, wood pulp, or even glass fibers.

The multilobal fibers may be formed from two or more than two distinct phases, for example from a central phase (core) to which the lobes are attached, it being possible for these lobes to be formed from different polymer materials.

They may especially be fibers prepared by the sol-gel route or glass-polymer hybrid fibers obtained by the molten route, for example by extrusion.

The organic fibers having a multilobal cross section that form the support layer (a) may be monofilament fibers or multifilament fibers consisting of several monofilaments. They may be continuous or discontinuous and preferably have an average linear density between 1 and 25 dtex, in particular between 3 and 15 dtex, and ideally between 5 and 12 dtex. The length of the fibers is advantageously between 0.5 and 15 cm, preferably between 1 and 10 cm and in particular between 2 and 8 cm.

The multilobal fibers are preferably fibers having a trilobal, tetralobal or pentalobal cross section.

The shape of the lobes is not particularly limited. It may be rounded or have edges. The lobes may have complex shapes, for example T or Y shapes, or each lobe may have several branchings.

It is known to define, for multilobal fibers, a modification ratio which corresponds to the ratio of the diameter (R) of the circumscribed circle of the cross section of the fibers to the ratio of the diameter (r) of the inscribed circle. This R/r ratio is preferably between 2 and 7, in particular between 3 and 6.

The support layer (a) formed from multilobal fibers may be obtained, in principle, by any technique for manufacturing nonwoven textiles, for example by needle-punching or spunbonding.

It preferably has a surface density between 200 and 800 g/m$^2$, more preferably between 250 and 500 g/m$^2$ and in particular between 300 and 400 g/m$^2$.

Multilobal fibers that can be used in the present invention and their manufacturing process are known and are described, for example, in US 2006/0012072, U.S. Pat. No. 6,815,383, WO03/105982, EP 0 595 157, EP 0 860 521, EP 0 201 812 and EP 2 272 999.

As already explained in the introduction, it is essential in the present invention that the adhesive layer at the interface between the layers (a) and (b) is not a continuous layer, formed for example by insertion of an adhesive film, such as, for example, in FR 2 672 908, U.S. Pat. No. 5,681,408 or FR 0 061 369.

The adhesive layer (c) must firmly adhesively bond the glass textile (b) to the support (a), while leaving a maximum of pores located at the interface between the layers (a) and (b) open. It is unfortunately very difficult, or even impossible, to quantify precisely the proportion of closed or open surface pores in the finished product.

In order to arrive at satisfactory acoustic results, it is necessary to keep to certain application quantities per unit of surface and not to deposit the adhesive in the form of a continuous film or layer. The adhesive must be deposited so as to cover relatively homogeneously, on the macroscopic scale, the entire extent of the interface, but it will be ensured that, on the microscopic scale, only certain zones are covered with adhesive and others remain empty. Such a "discontinuous" application may be carried out for example using a hot-melt adhesive in the form of a web or grid that is solid at ambient temperature which is inserted between the foam support and the glass fabric before subjecting the assembly to heating, under pressure, at a temperature above the softening or melting point of the adhesive. It is also possible to envisage applying the adhesive in the form of a hot-melt adhesive powder onto the nonwoven support (a) or onto the glass textile (b), then applying the second layer (b) or (a) and heating under pressure.

The chemical nature of the hot-melt adhesive is not a determining factor for the present invention and it will be possible to use conventional hot-melt adhesives based on polyurethanes, copolyamide (coPA) or copolymers of PET (coPET), such as for example the product Texiron 9D8 supplied by the company Protechnic.

Finally, the adhesive is not necessarily a hot-melt adhesive but may be a liquid composition of a reactive or thermosetting adhesive that is applied, for example, by printing to one of the two components to be adhesively bonded, making sure that the adhesive composition does not form a continuous film or layer.

The application in "discontinuous" mode described above will however only give good acoustic results if the application quantities specified above, between 17 and 60 g/m$^2$, preferably between 20 and 40 g/m$^2$, in particular between 21 and 30 g/m$^2$ and ideally between 22 and 27 g/m$^2$ are also respected. Indeed, if the quantities of adhesive applied are significantly greater than 60 g/m$^2$ of surface, the hot-melt adhesive risks spreading at the time of melting until a continuous layer is formed that blocks the surface pores of the support foam, which must absolutely be avoided. Conversely, if the quantities applied are significantly below 17 g/m$^2$, the adhesive strength at the foam/glass textile interface risks being insufficient and the applicant observed that the finished product then has absorption coefficients that are considerably worse, of the order of 0.1 to 0.15.

When the adhesive layer (c) is formed by a hot-melt adhesive, the softening point of the latter is preferably at least 10° C., in particular at least 15° C. and ideally at least 20° C. below the softening point of the thermoplastic polymer forming the multilobal fibers of the support layer (a). This is because it is necessary to prevent the structure of this support layer from being unfavorably modified under the influence of the laminating heat and pressure.

When all of the instructions above regarding the application method and quantities are respected, the adhesive layer (c), in the finished product, consists of a network of points and/or lines extending homogeneously over the entire interface between the layers (a) and (b). The adjective "homogeneous" here has the meaning of uniform on the macroscopic scale, and encompasses both ordered and random patterns on the microscopic scale.

The glass textile forming the surface layer (b) may be a glass cloth (that is to say a woven fabric consisting of warp and weft yarns) or a web (that is to say a nonwoven). It is also possible to envisage a combination of the latter, for example a nonwoven reinforced by a woven structure. The present invention does not however encompass glass textiles such as glass felts having a very loose structure that are obtained by needle punching. Such textiles, when they have a satisfactory mechanical strength, specifically have a thickness that is too large and above all do not generally lend themselves to the application of a paint.

The glass textile is preferably a glass cloth, that is to say a woven fabric obtained from glass yarns composed of a multitude of glass filaments (or strands) or derivatives of these yarns, especially the assemblies of these strands as rovings.

The glass cloth or web may optionally contain a relatively limited fraction, generally less than 20% by weight, preferably less than 10% by weight, of fibers consisting of an organic material. These other fibers may be natural fibers such as silk fibers, wool fibers, wood fibers, cellulose fibers or cotton fibers; synthetic or artificial fibers such as viscose or rayon fibers, polyethylene fibers, polypropylene fibers, polyethylene terephthalate fibers, polystyrene fibers, polymethyl methacrylate fibers, polyamide fibers, polyvinyl chloride fibers, polyacrylonitrile fibers, polyvinyl acetate fibers, polyvinyl alcohol fibers, polyester fibers, polytetratfluorethylene fibers and aramid fibers; metallic fibers, for example silver fibers, copper fibers or steel fibers; carbon fibers; mineral fibers, for example basalt fibers, silica fibers, alumina fibers or ceramic fibers.

The glass incorporated in the composition of the yarns may be of any type, for example of E, C, R or AR (alkali resistant) type. In particular E glass is preferred.

The diameter of the glass filaments forming the yarns may vary to a large extent ranging, for example, from 5 to 30 μm. The linear density of filaments may be between 30 and 1500 tex.

Advantageously, the glass cloth comprises, as warp, a twisted glass yarn (textile yarn) and, as weft, an untwisted glass yarn that has undergone a treatment that aims to separate the glass filaments so as to give them volume ("volumized" yarns). The linear density of the warp and weft yarns preferably varies from 50 to 500 tex.

Conventionally, the cloth or web to be painted is coated with a sizing composition that maintains the yarns and gives them suitable rigidity so that the installation on the final support can be carried out properly.

The glass textiles used in the present invention are known in the art and are available on the market, for example under the name Novelio from the company Adfors. They preferably have a surface density between 80 and 450 g/m$^2$, in particular between 100 and 300 g/m$^2$ and more preferably still between 150 and 250 g/m$^2$.

The multilayer structure of the present invention may comprise, in addition to the three layers (a), (b) and (c) described above, a fourth layer, referred to hereinbelow as underlayer (d), preferably that is permeable to water vapor and is adhesively bonded to the face of the support layer (a) opposite the face in contact with the surface layer (b).

This layer may be, for example, a film of plastic, a sheet of paper, a perforated metallic film, a woven fabric, a nonwoven fabric or a combination thereof.

This layer is mainly intended to facilitate the coating with adhesive of the multilayer structure before application to the walls of the room of which the acoustic comfort is to be improved. This underlayer (d) may of course be pre-coated with adhesive.

Finally, the multilayer structure of the present invention may comprise a fifth layer, referred to hereinbelow as an overlayer (e), formed by a layer of paint applied to the surface layer (b).

This paint may be applied before adhesive bonding of the structure to the wall, or else the multilayer structure may be painted only after adhesive bonding to the wall.

The overlayer of paint (e) may be any paint commonly used for decorating living spaces. It may be an aqueous-based acrylic paint or a glyptal paint. The final layer of paint may be microporous or not. It is generally applied with a coating weight of less than 600 g/m$^2$, preferably in a proportion of from 50 to 500 g/m$^2$, and in particular in a proportion of from 100 to 350 m$^2$/g.

As explained in the introduction, the choice of the materials of the various layers made it possible to obtain wall coverings having, in the painted state, sound absorption coefficients sufficient for allowing them to be classified as a sound-absorbing covering according to the standard NF EN ISO 11654 (classes D or E). This classification may be obtained for small thicknesses. The multilayer structures of the present invention therefore have an overall thickness between 3.5 and 6 mm, preferably between 4.0 and 5.5 mm.

The multilayer structures of the present invention may be manufactured according to lamination processes very similar to known processes and on existing installations commonly used for the manufacture of wall coverings.

In one such manufacturing process, which is also a subject of the present invention, superposed, in order, are a nonwoven made of multilobal fibers, a web of hot-melt adhesive and a glass textile, then the structure thus formed, comprising at least three layers, is subjected to a temperature at least equal to the softening point of the hot-melt adhesive, preferably while applying a pressure, for example by calendering.

One possible alternative to the use of a hot-melt web is the application of a powder or liquid adhesive composition to one of the faces of the nonwoven made of multilobal fibers or of the glass textile. The application may be carried out according to an ordered pattern (grid, network of equidistant points), for example by printing, or else according to a random pattern, for example by application of a powder or spraying of a liquid adhesive composition. After application of the adhesive composition, the nonwoven made of multilobal fibers is brought into contact with the glass textile, preferably under pressure and heating, so as to adhesively bond the glass textile firmly to the nonwoven made of multilobal fibers.

A final subject of the present invention is the use of a multilayer structure as described above for improving the acoustic comfort of a room or of a building. The process for improving the acoustic comfort comprises the application of a multilayer structure according to the invention, preferably by adhesive bonding, to one or more inner surfaces of said room or of said building, in particular to the walls.

EXAMPLE

A molleton made of Deep Groove multilobal fibers (4-DG®, 6 dpf×1.5" made of PET) supplied by the company FIT Fiber is produced by needle-punching in a thickness of 4.5 mm and a surface density of 300 g/m².

For comparison, a nonwoven is produced that is based on non-multilobal fibers based on viscose/polypropylene (90/10 weight ratio) having a linear density of 3.3 dtex. This comparative nonwoven has an identical surface density to the one based on Deep Groove fibers, namely equal to 300 g/m², and a thickness of 4.4 mm.

A paintable glass fiber cloth having a surface density of 220 g/m² and a static air flow resistivity of $7.7 \times 10^5$ N·s·m$^{-4}$ is laminated to each of the molletons. This lamination takes place using a web of hot-melt adhesive constituted of two-component fibers with a polyethylene terephthalate (PET) core and a coPET copolymer shell, this shell having a softening point below that of the central part made of PET homopolymer. The web of hot-melt adhesive has a surface density of 25 g/m². The three layers are superposed on one another and the assembly is adhesively bonded by heating at a temperature of around 90° C. under a calendering pressure of around 0.5 bar. The three-layer structure obtained has a total thickness of 5 mm. It is then adhesively bonded to BA13 plasterboard using a vinyl adhesive (Ovalit Ultra, from the company Henkel) and painted with a satin acrylic paint (150 g/m²). A surface of 10.80 m² is thus used for the tests in a reverberation room (NF EN ISO 354).

The sound absorption coefficient, calculated according to NF EN ISO 11654, is 0.25 for the example according to the invention using a support layer based on multilobal fibers and only 0.15 for the comparative covering using a nonwoven based on non-multilobal viscose/polypropylene fibres.

The invention claimed is:

1. A multilayer structure, having an overall thickness between 3.5 and 6 mm, comprising:
    (a) a support layer made of a nonwoven based on organic fibers having a multilobal transverse cross section,
    (b) a surface layer formed by a glass textile, having a static air flow resistance, measured according to the standard ISO 9053, between $10^5$ N·s·m$^{-4}$ and $10^6$ N·s·m$^{-4}$,
    (c) at the interface between the support layer (a) and the surface layer (b), a discontinuous adhesive layer having a surface density between 17 and 60 g/m².

2. The multilayer structure as claimed in claim 1, wherein the support layer has a surface density between 200 and 800 g/m².

3. The multilayer structure as claimed in claim 2, wherein the support layer has a surface density between 250 and 500 g/m².

4. The multilayer structure as claimed in claim 1, wherein the organic fibers having a multilobal cross section have an average linear density between 1 and 25 dtex.

5. The multilayer structure as claimed in claim 4, wherein the average linear density is between 3 and 15 dtex.

6. The multilayer structure as claimed in claim 1, wherein the fibers having a multilobal cross section comprise at least one synthetic thermoplastic organic polymer.

7. The multilayer structure as claimed in claim 1, wherein the fibers having a multilobal cross section are fibers having a trilobal, tetralobal or pentalobal cross section.

8. The multilayer structure as claimed in claim 1, wherein the fibers having a multilobal cross section have a modification ratio (R/r) between 2 and 7.

9. The multilayer structure as claimed in claim 8, wherein the modification ratio (R/r) is between 3 and 6.

10. The multilayer structure as claimed in claim 1, wherein the adhesive layer (c) comprises a hot-melt adhesive having a softening point at least 10° C. below the softening point of the polymer forming the support layer (a).

11. The multilayer structure as claimed in claim 10, wherein the hot-melt adhesive has a softening point at least 15° C. below the softening point of the polymer forming the support layer (a).

12. The multilayer structure as claimed in claim 1 wherein the adhesive layer (c) consists of a network of points or lines or both extending homogeneously over the entire interface between the layers (a) and (b).

13. The multilayer structure as claimed in claim 1, wherein the surface layer (b) is a glass cloth or a nonwoven of glass fibers.

14. The multilayer structure as claimed in claim 1, wherein the surface layer (b) has a surface density between 80 and 450 g/m².

15. The multilayer structure as claimed in claim 14, wherein the surface layer (b) has a surface density between 100 and 300 g/m².

16. The multilayer structure as claimed in claim 1, further comprising an underlayer (d) adhesively bonded to the face of the support layer (a) opposite the face in contact with the surface layer (b).

17. The multilayer structure as claimed in claim 16, wherein the underlayer (d) is permeable to water vapor.

18. The multilayer structure as claimed in claim 1, further comprising a paint overlayer (e) applied to the surface layer (b).

19. The multilayer structure as claimed in claim 1, wherein the multilayer structure has an overall thickness between 4.0 and 5.5 mm.

20. A process for improving the acoustic comfort of a room or of a building, comprising applying a multilayer structure as claimed in claim 1 by adhesive bonding, to one or more internal walls of said room or of said building.

21. A process for manufacturing a multilayer structure as claimed in claim 1, comprising superposing a nonwoven of organic fibers having a multilobal cross section, a web of hot-melt adhesive and a glass textile, and heating the structure comprising at least three layers thus formed to a temperature at least equal to the softening point of the hot-melt adhesive.

22. A process for manufacturing a multilayer structure as claimed in claim 1, comprising applying an adhesive composition in an ordered or random pattern to a nonwoven of organic fibers having a multilobal cross section or to a glass textile or both, and contacting the nonwoven of organic polymer fibers with the glass textile, so as to adhesively bond the glass textile to the organic polymer foam structure.

23. The multilayer structure as claimed in claim 1, wherein the static air flow resistance is between $5 \times 10^5$ N·s·m$^{-4}$ and $8.5 \times 10^5$ N·s·m$^{-4}$.

24. The multilayer structure as claimed in claim 1, wherein the surface density is between 20 and 40 g/m$^2$.

\* \* \* \* \*